United States Patent
Inoue et al.

(10) Patent No.: US 7,420,758 B2
(45) Date of Patent: Sep. 2, 2008

(54) HEAD SYSTEM, RECORDING AND REPRODUCTION SYSTEM, AND MAGNETIC RECORDING METHOD

(75) Inventors: Yasutoshi Inoue, Tokyo (JP); Hiroaki Hida, Chiba (JP); Toshiaki Wakita, Kanagawa (JP); Tetsuro Makise, Tokyo (JP); Ichiro Hashimoto, Kanagawa (JP)

(73) Assignee: Sony Corporation (JP)

( * ) Notice: Subject to any disclaimer, the term of this patent is extended or adjusted under 35 U.S.C. 154(b) by 503 days.

(21) Appl. No.: 10/750,820

(22) Filed: Jan. 5, 2004

(65) Prior Publication Data
US 2004/0207941 A1 Oct. 21, 2004

(30) Foreign Application Priority Data
Jan. 24, 2003 (JP) ............... P2003-015778

(51) Int. Cl.
*G11B 5/02* (2006.01)
(52) U.S. Cl. ............ 360/21; 360/64; 360/76; 360/77.12; 360/130.23; 360/121
(58) Field of Classification Search ......... 360/64, 360/66, 75, 76.77, 118, 119.05, 121, 122
See application file for complete search history.

(56) References Cited

U.S. PATENT DOCUMENTS

| | | | | |
|---|---|---|---|---|
| 4,539,615 A | * | 9/1985 | Arai et al. | 360/121 |
| 4,901,178 A | * | 2/1990 | Kobayashi et al. | 360/125.4 |
| 5,023,731 A | * | 6/1991 | Morisaki | 360/64 |
| 5,089,918 A | * | 2/1992 | Hirayama et al. | 360/70 |
| 5,153,980 A | * | 10/1992 | Kira | 29/603.14 |
| 5,349,478 A | * | 9/1994 | Sato et al. | 360/55 |
| 5,459,617 A | * | 10/1995 | Yanagihara | 360/21 |
| 5,745,318 A | * | 4/1998 | Kubota et al. | 360/73.06 |
| 5,912,780 A | * | 6/1999 | Yamada et al. | 360/64 |
| 5,963,388 A | * | 10/1999 | Yoshida et al. | 360/70 |
| 5,973,874 A | * | 10/1999 | Panish et al. | 360/76 |
| 5,978,165 A | * | 11/1999 | Magnusson | 360/73.04 |
| 5,995,315 A | * | 11/1999 | Fasen | 360/77.01 |
| 6,014,291 A | * | 1/2000 | Watanabe et al. | 360/121 |
| 6,031,673 A | * | 2/2000 | Fasen et al. | 360/53 |
| 6,055,358 A | * | 4/2000 | Traxlmayr | 386/96 |
| 6,078,459 A | | 6/2000 | Nonoyama | |

(Continued)

FOREIGN PATENT DOCUMENTS

JP 9-245394 9/1997

*Primary Examiner*—Hoa T. Nguyen
*Assistant Examiner*—Dismery Mercedes
(74) *Attorney, Agent, or Firm*—Rader Fishman & Grauer PLLC; Ronald P. Kananen

(57) ABSTRACT

Disclosed is a head system including a plurality of recording heads for azimuth recording. The system includes a first recording head having a plurality of magnetic gaps having a first azimuth angle, and a second recording head having a plurality of magnetic gaps having a second azimuth angle different from the first azimuth angle. After first magnetization patterns are formed on a recording medium by the first recording head, second magnetization patterns are formed by overwriting side edge portions in the formation direction of the first magnetization patterns by the second recording head. This makes it possible to prevent the worsening of the accuracy of the magnetization pattern width due to a relative height stagger (offset) between the heads, to thereby enhance the accuracy of the magnetization pattern width, and to achieve high-density recording.

6 Claims, 8 Drawing Sheets

U.S. PATENT DOCUMENTS

| | | | | |
|---|---|---|---|---|
| 6,104,291 | A * | 8/2000 | Beauvillier et al. | 340/572.1 |
| 6,172,857 | B1 * | 1/2001 | Inaguma et al. | 360/271 |
| 6,236,538 | B1 * | 5/2001 | Yamada et al. | 360/126 |
| 6,246,830 | B1 * | 6/2001 | Traxlmayr | 386/96 |
| 6,473,273 | B1 * | 10/2002 | Kikuiri | 360/271.5 |
| 6,496,329 | B2 * | 12/2002 | Hungerford et al. | 360/121 |
| 6,650,496 | B2 * | 11/2003 | Nozieres et al. | 360/63 |
| 6,922,298 | B2 * | 7/2005 | Ozue | 360/64 |
| 7,106,535 | B2 * | 9/2006 | Magnusson | 360/64 |
| 2002/0080519 | A1 * | 6/2002 | Hughes et al. | 360/77.13 |

* cited by examiner

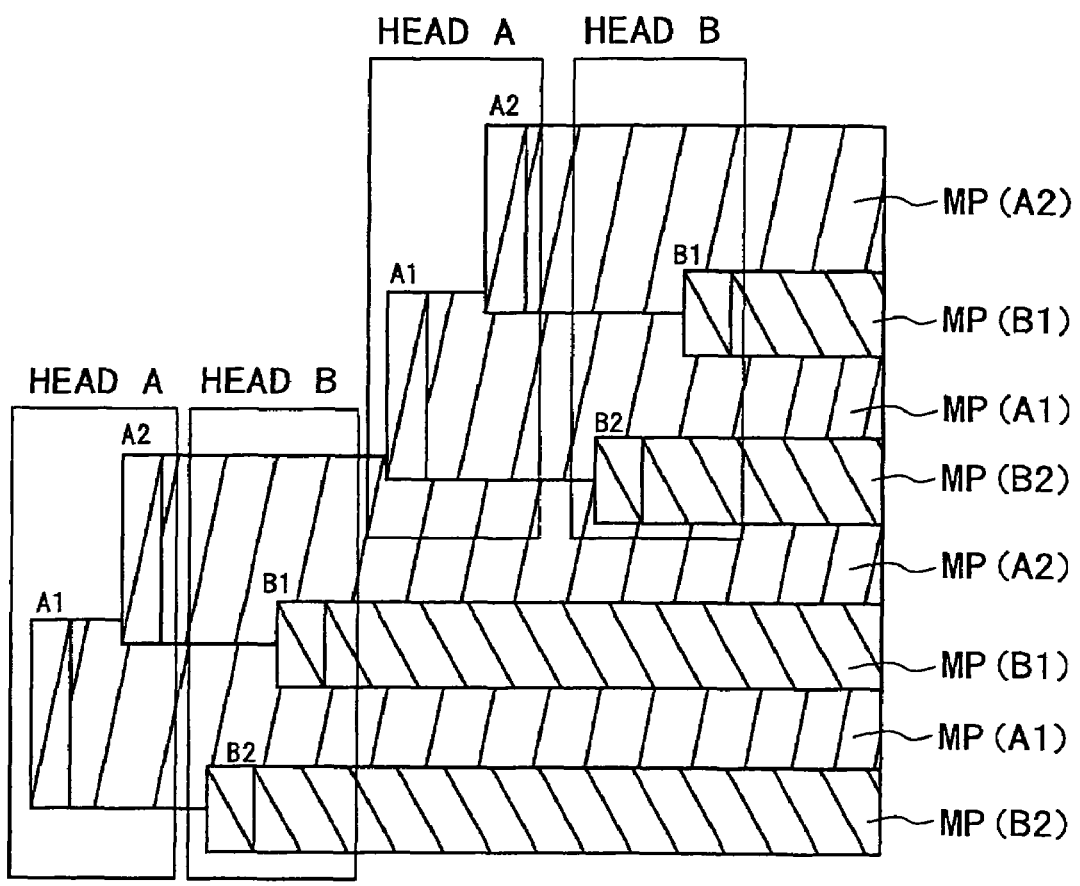
F I G. 5

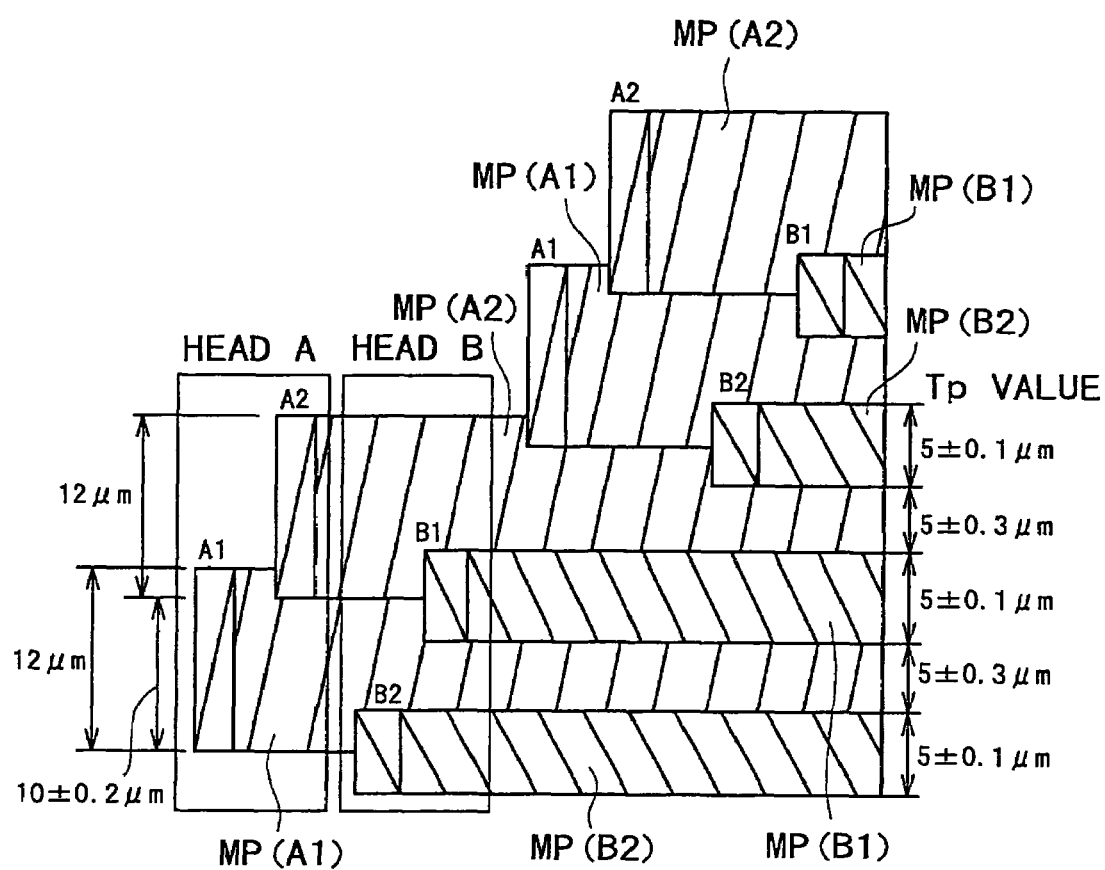
F I G. 6

HEAD SYSTEM, RECORDING AND REPRODUCTION SYSTEM, AND MAGNETIC RECORDING METHOD

BACKGROUND OF THE INVENTION

The present invention relates to a technology for enhancing the accuracy of formation of magnetization patterns recorded on a recording medium in a head system including magnetic heads and a recording and reproduction system using the head system.

As a recording and reproduction system capable of recording and reproducing desired information on a tape form recording medium, such as a magnetic tape, there have been known tape recorders (VTR, DAT, etc.) for recording and reproducing video signals and audio signals, tape streamers (or data recorders) for processing of data, and the like, in which a rotary head system (so-called rotary drum system) including magnetic heads and a rotary transformer is used.

In rotary magnetic recording by a helical scan system, where azimuth recording on a magnetic tape is assumed, the use of recording heads having gaps differing in azimuth angle makes it possible to reduce crosstalk between adjacent recording tracks by utilizing azimuth loss. For example, in a configuration using a rotary head system on which four recording heads, i.e., two + (positive direction) azimuth recording heads (hereinafter referred to as "A1" and "A2") and two − (negative direction) azimuth recording heads (hereinafter referred to as "B1" and "B2") are mounted, in the case where the recording heads are disposed with a predetermined angular interval (for example, 90°) around the center axis of rotation of a rotary drum, magnetization patterns on the magnetic tape are sequentially formed by the recording heads in the rotation direction of the rotary drum. That is, the magnetization patterns on the tape are sequentially recorded by the recording heads as inclined tracks extending in the skew direction relative to the tape feeding direction (see, for example, Japanese Patent Laid-open No. Hei 9-245394 (FIGS. 5 and 20)).

FIG. 8 shows schematically the formation of magnetization patterns on a tape, in which the track formation direction is set on the axis of abscissas and recording heads are disposed in the order of A1, B1, A2, and B2 along the rotation direction of a rotary drum.

As shown in the figure, the recording heads A1 and A2 have + azimuth magnetic gaps, while the recording heads B1 and B2 have − azimuth magnetic gaps. A magnetization pattern MP(A1) is formed by the recording head A1, a magnetization pattern MP(B1) is formed next to the magnetization pattern MP(A1) by the recording head B1, then a magnetization pattern MP(A2) is formed by the recording head A2, and thereafter a magnetization pattern MP(B2) is formed by the recording head B2.

Incidentally, the hatching (slant lines) shown in each magnetization pattern indicates, by the difference in its direction, a difference in azimuth angle pertaining to the recording heads. In this figure, in the vertical direction orthogonal to the formation direction of each magnetization pattern, the direction from the lower side toward the upper side in the figure is the time lapse direction, and, in the same magnetization pattern, the direction from the left side toward the right side in the horizontal direction in the figure is the time lapse direction.

Therefore, MP(A1), MP(B1), MP(A2) and MP(B2) are recorded on an overwriting mode sequentially from the lower side toward the upper side in the figure according to time series, resulting in the formation of magnetization patterns as shown in FIG. 8 on the tape.

In this case, the relative heights of the recording heads are so set that the widths (hereinafter referred to as "Tp") of the magnetization patterns (or record patterns) required can be obtained.

Attendant on the rotation of the rotary drum, data are recorded in the order of the recording heads A1, B1, A2 and B2. After one rotation of the rotary drum, data are sequentially recorded in the order of the recording heads A1, B1 . . . in the same manner as above, whereby a series of signal patterns composed of inclined tracks are formed.

Incidentally, the value of head width (hereinafter referred to "Tw") of each recording head is set to be greater than the required width "Tp". This ensures that, for example, a record portion corresponding to an end portion (an upper portion of FIG. 8) in the head width direction of the recording head A1 is overwritten by an end portion (a lower portion of FIG. 8) in the head width direction of the recording head B1, resulting in the formation of magnetization patterns with the required Tp values.

However, in the conventional configuration, it is difficult to enhance the accuracy of the magnetization pattern width on the tape.

The required width Tp varies under the influences of dispersion of relative heights of the recording heads, periodic or non-periodic oscillation in the vertical direction (rotation axis direction) at the time of rotation of the rotary drum, rotational jitter, etc.

In the examples shown in FIG. 8, in the setting of Tp=5 (unit: μm), the relative height of the recording head B1 has been set off by 1 μm to the lower side in the figure in relation to an ideal position (height) for the recording head, and the relative height of the recording head B2 has been set off by 1.5 μm to the upper side in the figure.

Specifically, in this case, the Tp values (unit: μm) for the recording heads are as follows:

Recording head A1: Tp=4 (=5−1)
Recording head B1: Tp=6 (=5+1)
Recording head A2: Tp=6.5 (=5+1.5)
Recording head B2: Tp=3.5 (=5−1.5)

Where the relative heights of the heads have thus been set off, dispersion in relation to the ideal Tp values would be enlarged.

As a countermeasure against the above problem, it is necessary to suppress the dispersion of the relative heights of the recording heads. Since the recording heads are formed of a metallic material, however, there arise the influences of temperature change and the change with time of the metallic material and the like, so that it is practically impossible to eliminate the dispersion of heights completely. In addition, as for causes of other variation (for example, periodic or non-periodic oscillation in the vertical direction at the time of rotation of the drum, rotational jitter, etc.), there is a certain limit to the preclusion of the influences of the causes of variation (for example, in the present status, the total variation amount of Tp values can be suppressed only to about 1 μm, or a high cost would be required to obtain a higher accuracy).

Incidentally, in the above-mentioned case, as for the accuracy of Tp values, there arises a dispersion of about ±1 μm for Tp=5 μm, i.e., −1 μm for 5 μm (that is, 4 μm); when reduced to record signal level, this dispersion corresponds to a lowering in S/N (signal to noise) ratio by about 2 dB (≈20·log(4/5)). Particularly, the influence increases in the case of small Tp values.

SUMMARY OF THE INVENTION

It is an object of the present invention to enhance the accuracy of the width of magnetization patterns formed on a magnetic tape and to eliminate the need for greatly enhancing the accuracy relating to the factors (such as relative heights of heads) influencing the magnetization pattern width.

In order to attain the above object, the present invention provides the following configurations.

According to the first aspect of the present invention, there is provided a head system for performing azimuth recording on a recording medium by use of a plurality of recording heads, wherein:

the head system includes a first recoding head including a plurality of magnetic gaps having a first azimuth angle and a second recording head including a plurality of magnetic gaps having a second azimuth angle different from the first azimuth angle; and positional relationship between the magnetic gaps is so determined that in relation to each of the magnetization patterns formed on the recording medium by the magnetic gaps of the first recording head, side edge portions in the formation direction of the patterns are overwritten by the magnetic gaps of the second recording head.

According to the second aspect of the present invention, there is provided a recording and reproduction system for performing azimuth recording on a tape form recording medium by a plurality of recording head, the system including a head system having a plurality of the recording heads and a tape feeding means for feeding the tape form recording medium, wherein;

the head system includes a first recording head including a plurality of magnetic gaps having a first azimuth angle and a second recording head including a plurality of magnetic gaps having a second azimuth angle different from the first azimuth angle; and positional relationship between the magnetic gaps is so determined that in relation to each of the magnetization patterns formed on the tape form recording medium by the magnetic gaps of the first recording head, side edge portions in the formation direction of the patterns are overwritten by the magnetic gaps of the second recording head.

According to the third aspect of the present invention, there is provided a magnetic recording method for performing azimuth recording on a recording medium by use of a plurality of recording heads, including the steps of:

forming first magnetization patterns on the recording medium by a first recording head including a plurality of magnetic gaps having a first azimuth angle; and forming second magnetization patterns on the recording medium by overwriting side edge portions in the formation direction of the first magnetization patterns by a second recording head including a plurality of magnetic gaps having a second azimuth angle different from the first azimuth angle.

In other words, after the first magnetization patterns are formed on the recording medium by the first recording head, the second magnetization patterns are formed by overwriting side edge portion in the formation direction of the first magnetization patterns.

According to the present invention, therefore, the accuracy of the magnetization pattern width is determined by only the accuracy of the width of the magnetic gaps of the second recording head and the accuracy of the relative positions of these magnetic gaps, and it is not influenced by set-off or variation of the relative positional relationship between the magnetic gaps of the first recording head and the magnetic gaps of the second recording head.

In addition, according to the present invention, since the accuracy relating to the formation of magnetization pattern width is not influenced by such factors as set-off or variation of the relative positional relationship between the magnetic gaps in each recording head, it is possible to enhance the accuracy of the magnetization pattern width while maintaining the present accuracy. In other words, a further higher accuracy can be realized by the present invention, even where the accuracy has been enhanced. Therefore, it is possible to prevent the lowering of the S/N ratio or the recording and reproduction performance and to meet the demand for a reduction in the width of magnetization patterns and the like.

Besides, according to the present invention, the accuracy of the magnetization pattern formation width is not adversely affected even when the centers of the magnetization gaps of the second recording head are slightly staggered from the side edge portions of the first magnetization patterns in one of the directions orthogonal to the pattern formation direction under the influences of a set-off of the relative positions of the first recording head and the second recording head, etc. Therefore, the present invention provides a high degree of allowance for the positional set-off between the heads and the above-mentioned variation factors.

Further, according to the present invention, it is possible to reduce the width of the record track, to enhance the recording capacity, and to enhance the accuracy of recording.

BRIEF DESCRIPTION OF THE DRAWINGS

The above and other objects, features and advantages of the present invention will become apparent from the following description and appended claims, taken in conjunction with the accompanying drawings, wherein:

FIG. 5 is an illustration of the formation of magnetization patterns;

FIG. 6 is an illustration of the positional relationship between magnetic gaps and the formation of magnetization patterns;

DETAILED DESCRIPTION OF THE PREFERRED EMBODIMENT

An object of the present invention is to enhance the accuracy relating to the formation of magnetization patterns (or record signal patterns) in a head system for performing azimuth recording on a recording medium, such as a magnetic tape, by use of a plurality of recording heads and a recording and reproduction system using the head system.

Figure 1:
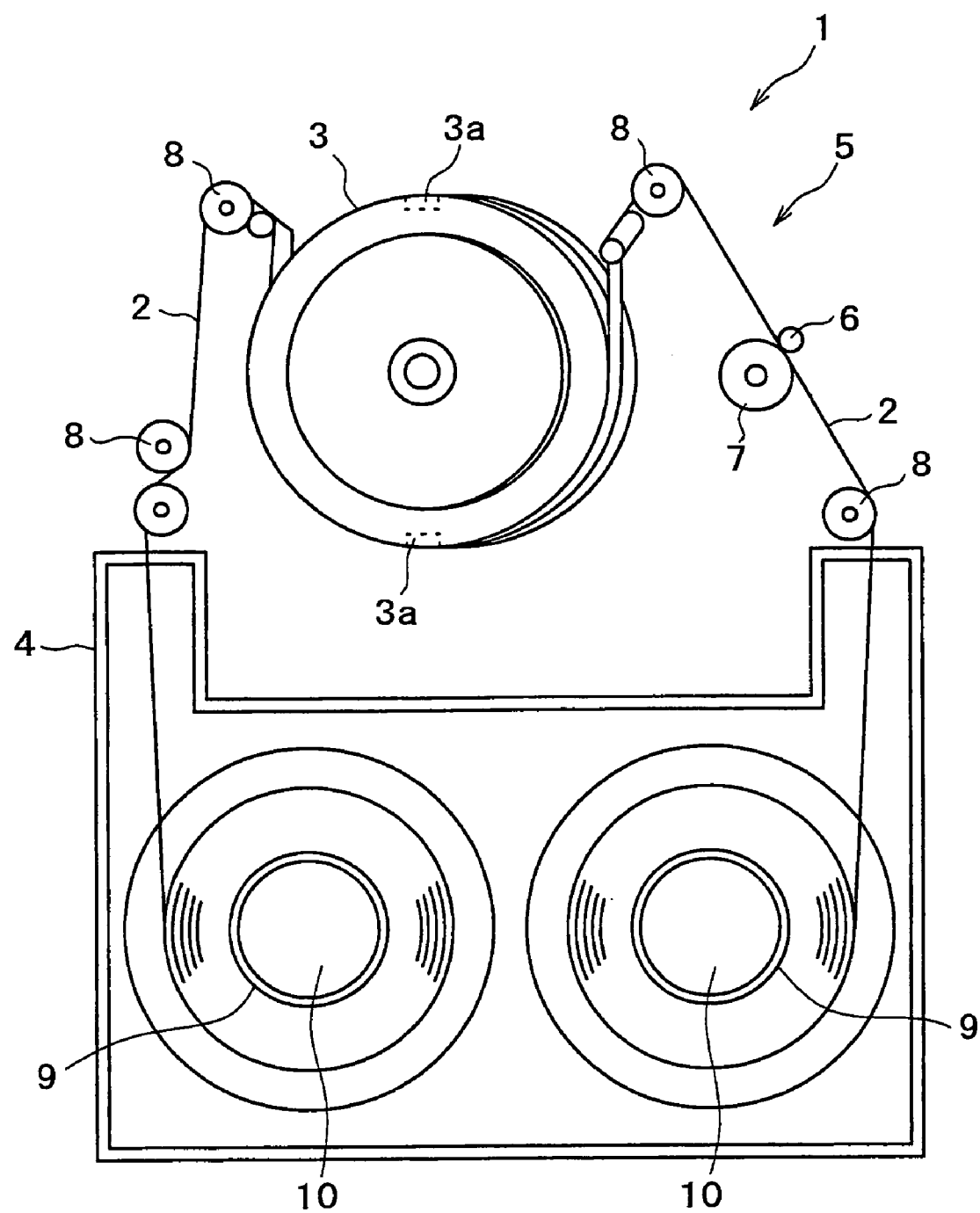
FIG. 1 shows schematically an example of the configuration of a recording and reproduction system.

FIG. 1 shows schematically an example of a configuration of a recording and reproduction system using a head system according to the present invention.

The recording and reproduction system 1 includes a rotary head system 3 for recording information on a tape form recording medium (hereinafter referred to simply as "tape") and for reproducing the recorded information. It is to be noted that the term "recording and reproduction system" herein refers to a system that is dedicated to recording as well as a system that performs both recording and reproduction.

The tape 2 led out from a tape cassette 4 to the exterior is fed along a predetermined tape path in the condition where a portion of the tape 2 is wrapped around a drum constituting the rotary head system 3.

In this embodiment, the rotary head system 3 is constituted as a rotary head system using a rotary drum and a fixed drum, and magnetic recording on the tape 2 and reproduction of the recorded information are conducted by use of magnetic heads 3a annexed to the rotary drum. The drum constituting the rotary head system 3 is supported in the condition where the axis thereof is inclined against a chassis that is not shown, and the tape 2 led out of the tape cassette 4 is wrapped around the drum at a predetermined wrap angle. Incidentally, transfer of signals between a circuit unit provided inside the head drum and a signal processing unit (inclusive of a recording circuit, a reproducing circuit, etc.) (not shown) provided in the exterior of the head drum is performed by use of a rotary transformer.

A tape feeding means 5 for feeding the tape 2 along the predetermined tape path includes a capstan 6, a pinch roller 7, tape guide members 8 (guide pins and tape guide posts), etc.; and the tape 2 led out of the tape cassette 4 is fed in the state of being clamped between the capstan 6 and the pinch roller 7.

Incidentally, reel bases 10, 10 and a rotation drive mechanism and a servo control circuit therefor are provided as a control means (reel rotation control means) relating the drive of reels 9, 9 provided inside the tape cassette 4. A drive mechanism and a servo control circuit constituting a rotation control means for the head drum and the like are also provided.

Figure 2:
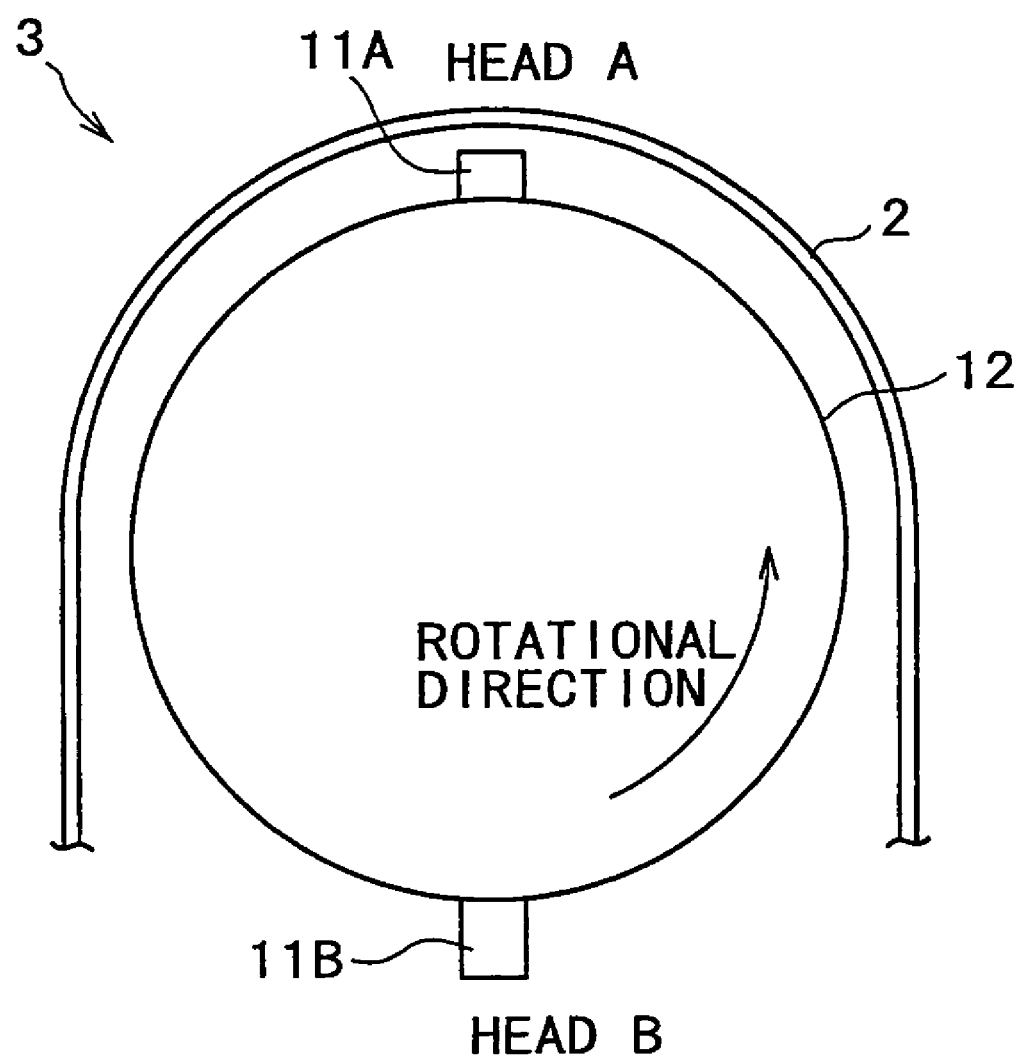
FIG. 2 shows an example of the layout of recording heads in a rotary head system.

FIG. 2 shows an example of a configuration of the recording head in the rotary head system and is a schematic view as viewed along the rotational axis direction of the head drum.

In this embodiment, two recording heads 11A and 11B are provided on a rotary drum 12, and these heads are disposed on the opposite sides with respect to the rotational axis. Hereinafter, the recording head 11A will be referred to as "head A", and the recording head 11B will be referred to as "head B".

The recording heads 11A and 11B record the record signal patterns by forming inclined tracks on the tape 2 while being rotated together with the rotary drum 12 in the rotational direction indicated by an arrow in FIG. 2.

While head A and head B are disposed at an angular interval of 180° around the rotational axis in this embodiment, the layout is not limited to this; various configurations, such as one in which the heads are disposed close to each other so as to reduce the difference in height variation at the time of recording, may be adopted.

Besides, as for the recording heads, the following configurations may be mentioned;

(I) A configuration in which a single head chip is provided with a plurality of magnetic gaps; and (II) A configuration in which a plurality of head chips each provided with a single magnetic gap are used to constitute a head.

Figure 3:
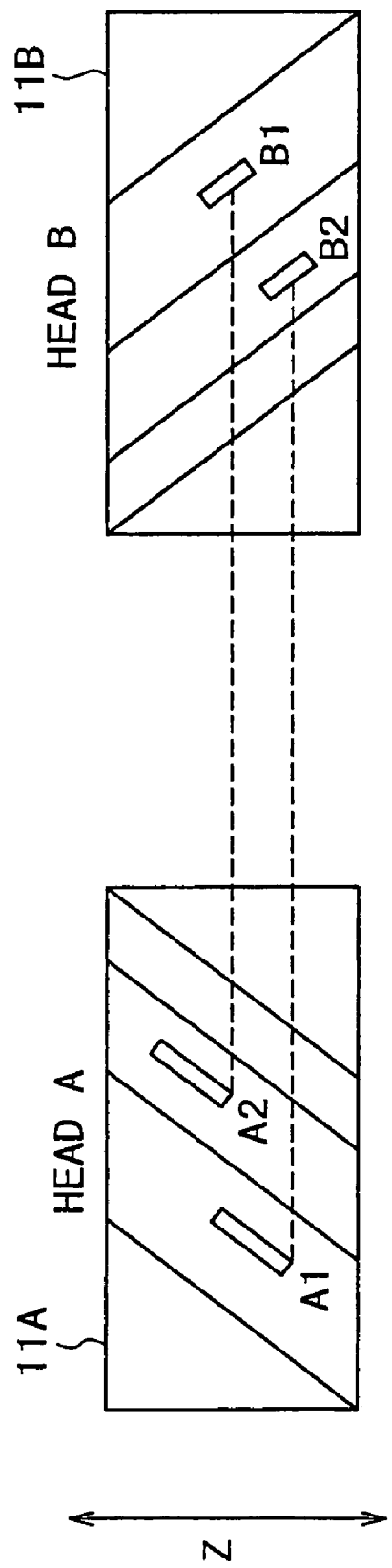
FIG. 3 shows an example of each recording head according to the present invention.

FIG. 3 shows an example of recording heads 11A and 11B different in azimuth angle (inclusive of direction), in the configuration (I) above. In this embodiment, a configuration in which a single head chip is provided with two magnetic gaps is adopted. Incidentally, this figure is a schematic view of a head surface as viewed in a direction orthogonal to the surface opposed to the tape (in the case of viewing from the head drum side).

The recording head 11A shown on the left side in FIG. 3 includes a plurality of magnetic gaps (see A1 and A2) having a first azimuth angle.

As shown in the figure, the gaps A1 and A2 (+ azimuth magnetic gaps) provided in a single chip are formed along the same azimuth direction (the direction of skewly going from the right upper side toward the left lower side) and have the same azimuth angle. Incidentally, as for the height relationship (arrows Z indicate the height direction) between A1 and A2, A1 is set to be relatively lower than A2.

The recording head 11B shown on the right side in FIG. 3 includes a plurality of magnetic gaps (see B1 and B2) having a second azimuth angle different from the first azimuth angle.

As shown in the figure, the gaps B1 and B2 (− azimuth magnetic gaps) provided in a single chip are formed along the same azimuth direction (the direction skewly going from the left upper side toward the right lower side) and have the same azimuth angle. Incidentally, as for the height relationship between B1 and B2, B2 is set to be relatively lower than B1.

Thus, in this configuration, the magnetic gaps having the same azimuth are formed in the single chip while maintaining a predetermined height relationship, and the individual heads each have the independent magnetic gaps. Specifically, thin-film heads produced by utilizing a semiconductor process technology are used.

As for the relative positional relationship between the gaps A1 and A2 and the gaps B1 and B2, as indicated by broken lines, the height of the lower edge portion (in the figure) of the gap A1 is set to be roughly the same as the height of a central portion of the gap B2, and the height of a lower edge portion (in the figure) of the gap A2 is set to be roughly the same as the height of a central portion of the gap B1.

As for the height relationship between the gaps A1 and A2 in head A (11A), the upper edge of A1 is at the same height as the lower edge of A2, or a slight clearance is provided between the upper edge of A1 and the lower edge of A2, or the upper edge of A1 and the lower edge of A2 overlap on each other. In other words, where the upper edge of A1 is at the same height as the lower edge of A2, side edges of magnetization patterns formed on the tape by the magnetic gaps coincide with each other at the boundary therebetween. Where there is a slight clearance between the upper edge of A1 and the lower edge of A2, the magnetization patterns formed on the tape by the magnetic gaps will not overlap on each other. Where the upper edge of A1 is at a higher position than the lower edge of A2, the magnetization patterns formed on the tape by the magnetic gaps overlap on each other. In the application of the present invention, any of these layouts can be adopted.

In addition, A1 and A2 are so designed that the width (Tw) values thereof are greater than the predetermined Tp (the magnetization pattern width after completion) value.

Besides, the magnetic gaps B1 and B2 in head B (11B) have width values (Tw values) equivalent to the predetermined Tp value. Further, the relative height difference between B1 and B2 has a value of two times the predetermined Tp value. Namely, in relation to the ideal width value Tp for the magnetic gaps B1 and B2 of head B, the relative position difference (height difference) between the magnetic gaps is set to be "2·Tp".

Figure 4:
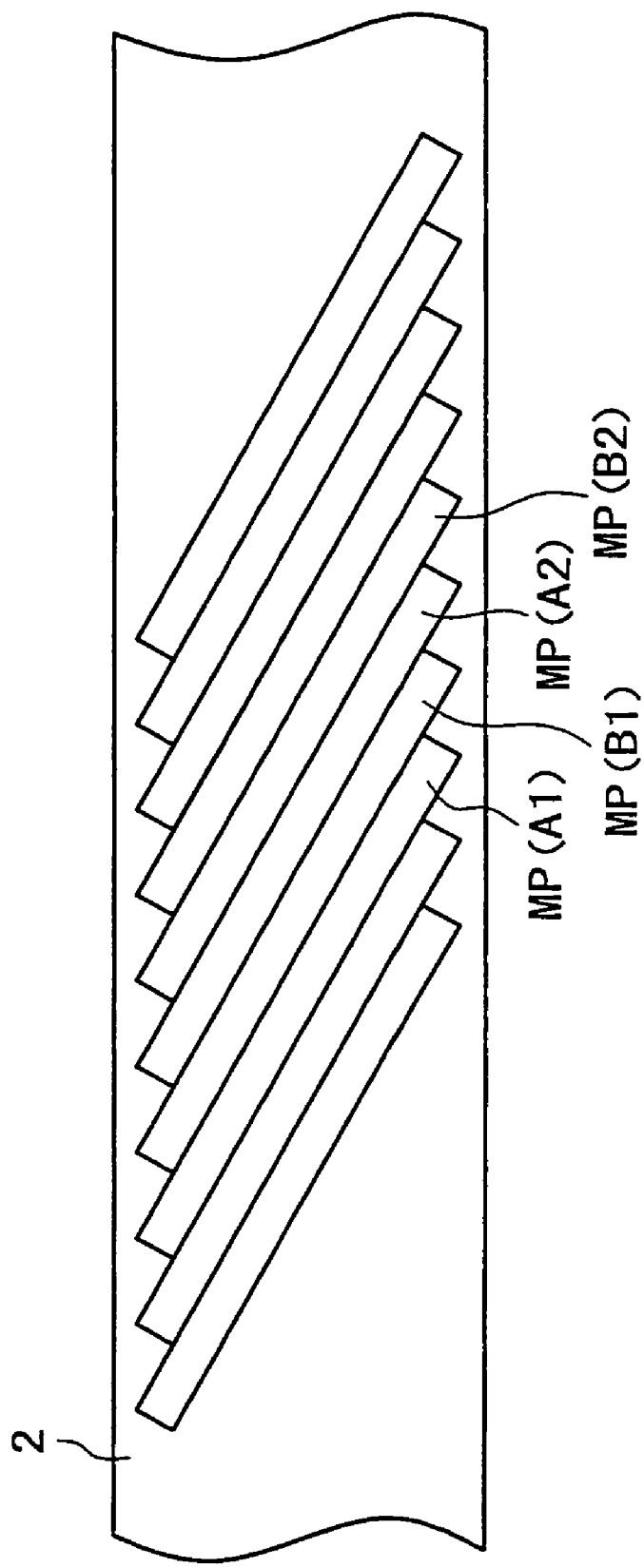
FIG. 4 is an illustration of the formation of record signals on a tape.

FIG. 4 shows schematically the manner in which signal recording is conducted on a tape by each recording head. In the figure, "MP(X)" (X represents one of A1, A2, B1, and B2)

denotes a magnetization pattern formed by a magnetic gap "X". In the direction from the left side toward the right side in the figure, magnetization patterns MP(A1), MP(B1), MP(A2), and MP(B2) corresponding respectively to the gaps A1, B1, A2, and B2 are sequentially disposed; it should be noted, however, that the patterns are not necessarily formed in this order on a time-series basis.

FIG. 5 is an illustration of the formation of magnetization patterns by heads A and B. The figure schematically shows the manner in which after the magnetization patterns (or record patterns) are formed on the tape by the heads, and after one rotation of the rotary drum, the next magnetization patterns are formed by the heads. Incidentally, the hatching composed of inclined lines in the patterns indicates, by the difference in the direction thereof, the difference in azimuth angle. In addition, for easy looking at the difference between the patterns formed by the magnetic gaps, the starting positions of the patterns are intentionally staggered in the figure (this applies also to FIGS. 6 and 7, which will be described later).

A magnetic recording method is as follows. Magnetization patterns MP(A1) and MP(A2) are formed on the tape by the magnetic gaps A1 and A2 of head A (11A), and, thereafter, magnetization patterns MP(B1) and MP(B2) are formed by overwriting side edge portions in the formation direction of the magnetization patterns MP(A1) and MP(A2) by the magnetic gaps B1 and B2 of head B (11B).

Now, a description will be made along the time series. First, the magnetization pattern MP(A1) is formed by the magnetic gap A1. Next, the magnetization pattern MP(A2) is formed by the magnetic gap A2 having the same azimuth as A1. In this embodiment, the relative height relationship between the magnetic gaps A1 and A2 is so determined that, in the figure, an upper edge portion of the pattern MP(A1) is overwritten by a lower edge portion of the pattern MP(A2), and an upper edge portion of the pattern MP(A2) is overwritten by a lower edge portion of the next pattern MP(A1).

Thereafter, the magnetic pattern MP(B2) is formed by the magnetic gap B2. In this case, the B head is so disposed that, as seen from the recording surface on the tape, a lower edge portion of the magnetization pattern MP(A1) and a central portion in the width (Tw) direction of B2 are in an overlapping positional relationship. Therefore, the magnetization pattern MP(A1) is overwritten by the magnetization pattern MP(B2) by B2 in such a relationship that the side edge (lower edge) of the magnetization pattern MP(A1) coincides substantially with the center of the magnetization gap B2.

Next, a lower edge portion of the magnetization pattern MP(A2) and a portion near the upper edge of the magnetization pattern MP(A1) are overwritten by the magnetization pattern MP(B1) formed by the magnetic gap B1. Namely, the magnetization patterns MP(A2) and MP(A1) are overwritten by the magnetization pattern MP(B1) in such a relationship that, as seen in a direction orthogonal to the recording surface on the tape, the position of a central portion in the width (Tw) direction of the magnetic gap B1 coincides substantially with the lower edge of the magnetization pattern MP(A2).

In this case, the magnetization pattern MP(A1) previously recorded is partly left between the magnetization patterns MP(B1) and MP(B2), and a record track (width: Tp) of A1 is formed by the pattern MP(A1).

Next, after one rotation of the rotary drum, at a position staggered to the upper side by the tape feeding, magnetization patterns MP(A1) and MP(A2) are formed in this order, whereby an upper edge portion of the magnetization pattern MP(A2) having been recorded one rotation before is overwritten by a lower edge portion of the magnetization pattern MP(A1).

Then, in the same manner as one rotation before, an upper edge portion of the magnetization pattern MP(A1) is overwritten by a lower edge portion of the magnetization pattern MP(A2), and, thereafter, a lower edge portion of the magnetization pattern MP(A1) and a portion near the upper edge of the magnetization pattern MP(A2) having been recorded one rotation before are overwritten by the magnetic gap B2 to form thereby a magnetization pattern MP(B2).

In this case, the magnetization pattern MP(A2) having previously been recorded is partly left between the magnetization pattern MP(B1) recorded one rotation before and the magnetization pattern MP(B2) recorded this time, and a record track (width: Tp) of A2 is formed by the pattern MP(A2).

Thereafter, the above-described procedure is repeated, whereby magnetization patterns corresponding respectively to A1, B1, A2, and B2 are sequentially formed, as one goes toward the upper side in the figure. Namely, the record tracks corresponding to B1 and B2 are formed in correspondence with the magnetization patterns MP(B1) and MP(B2), respectively, in a predetermined width Tp, whereas the record track corresponding to A1 is formed between MP(B1) and MP(B2), and the record track corresponding to A2 is formed between MP(B2) and MP(B1), which has been recorded one rotation before (the relative heights of B1 and B2 are so set that these tracks have the predetermined width Tp).

Thus, the positional relationship (gap-to-gap spacing, etc.) between the magnetic gaps is so determined that, of the magnetization patterns formed on the recording medium by the magnetic gaps (A1, A2) of head A, side edge portions in the formation direction of the patterns are overwritten by the magnetic gaps (B1, B2) of head B.

Meanwhile, if the recording heads are produced ideally, no error is present in the relationships such as the widths Tw and relative heights of the magnetic gaps, so that the widths of recorded signal patterns formed by the magnetic gaps have a constant value. In practice, however, there are a dispersion and an accuracy limit as to Tw and the like. In view of this, a description will be made below based on a practical example.

As an example, Tp=5 µm is set, and the following design conditions are assumed:

Width of A1 and A2: Tw=12 µm;

Width of B1 and B2: Tw=5 µm; and

Relative height relationship (difference in height) between B1 and B2: 10(=2×5) µm FIG. 6 is an illustration of the positional relationship between the magnetic gaps and the formation of magnetization patterns, in which various sizes necessary for the description are shown.

Where thin-film heads produced by utilizing the semiconductor process technology are used as the recording heads as above-mentioned, it is possible to set the accuracy of Tw for the heads to be about ±0.1 µm and to set the accuracy of relative heights of A1, A2 and B1, B2 to be about ±0.2 µm.

In the example shown, the case where the accuracy of the width Tw of B1 and B2 is 0.1 µm is shown, and since the Tw values are (5±0.1) µm, the completed width (Tp value) of the record tracks formed by B1 and B2 is (5±0.1) µm.

In addition, since the accuracy of the relative heights of A1 and A2 and the relative heights of B1 and B2 is ±0.2 µm, the completed width (Tp value) of the record track formed between the magnetization patterns MP(B1) and MP(B2) by A1 and A2 is (5±0.3) µm. Namely, the accuracy of the Tp value is determined by the accuracy (±0.3 µm) obtained by taking into account the accuracy (±0.2 μm) of the relative heights of B1 and B2 in addition to the accuracy (0.1 μm) of the width Tw of B1 and B2; though the accuracy of Tp value is slightly worse than the accuracy as to B1 and B2, it shows a better accuracy as compared to that in the relative art described referring to FIG. 8 above.

In the case where the lower edge of the magnetization pattern MP(A2) coincides with the center of the magnetization pattern MP(B1) and the lower edge of the magnetization pattern MP(A1) coincides with the center of the magnetization pattern MP(B2), when it is assumed that the relative positional stagger between head A (A1, A2) and head B (B1, B2) is, for example, 1 μm as on a current technology level, the accuracy of the Tp value after completion of production in the present invention is constant in any of the case where head B is staggered to the upper side by 1 μm relative to head A and the case where head B is staggered to the lower side by 1 μm relative to head A.

Figure 7:
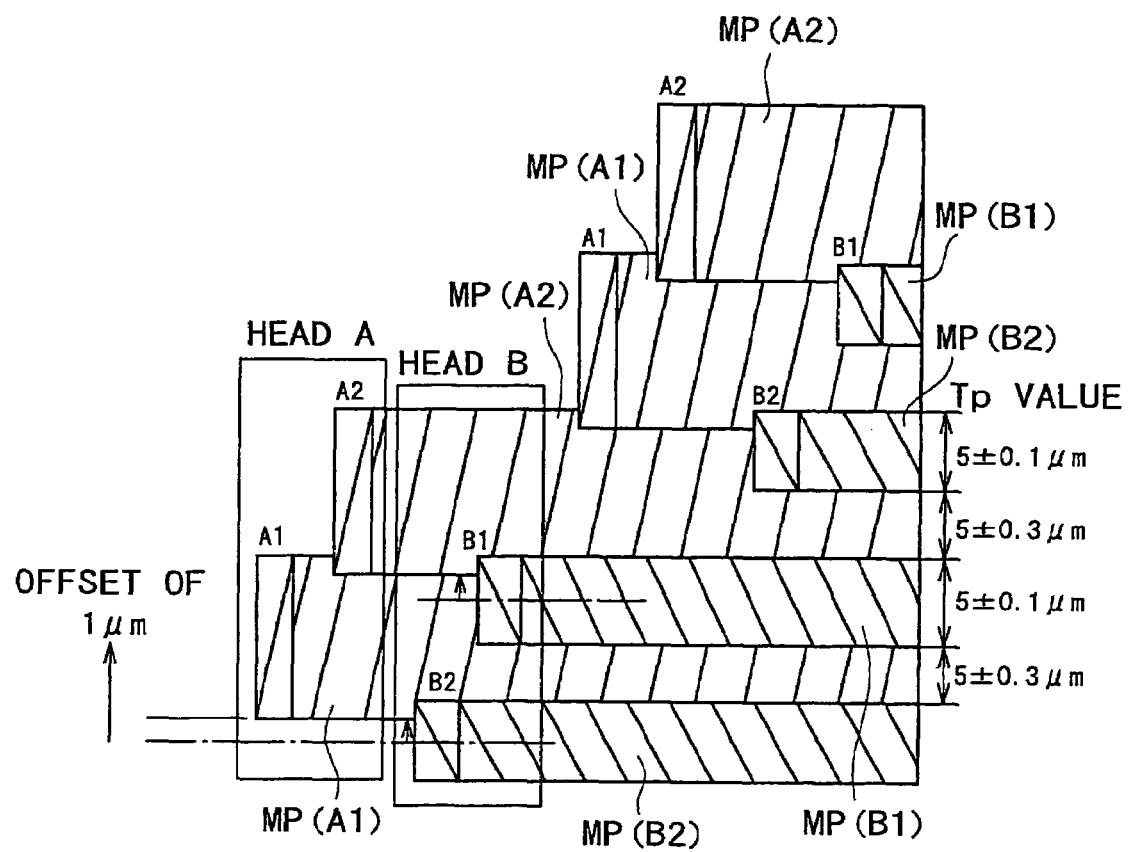
FIG. 7 illustrates an example of the case where the height of head A is set off relatively to head B.

FIG. 7 shows the case where head A is staggered to the upper side in the figure by 1 μm relative to head B, as an example (in the figure, the stagger or offset amount is exaggerated).

Even when the positional stagger (or offset) is generated, the accuracy of the Tp value as to B1 and B2 remains (5±0.1) μm, and the accuracy of Tp value as to A1 and A2 remains (5±0.3) μm.

Namely, the accuracy of the Tp value as to B1 and B2 is determined by only the accuracy of the width Tw of B1 and B2, and the accuracy of the Tp value as to A1 and A2 is determined by only the width Tw of B1 and B2 and the accuracy of the relative heights of both members (the accuracy of the Tp value is not influenced by slight positional staggers between A1 and B2 or between A2 and B1).

Thus, in the case where there is a dispersion of relative heights between head A (A1, A2) and head B (B1, B2), or in the case where there are influences of periodic or non-periodic oscillation in the vertical direction (rotational axis direction) attendant on rotation of the rotary drum, rotational jitter, etc., it is possible to enhance the accuracy of the Tp values (to set errors to below 1 μm) even where the accuracy is on the order of the above-mentioned current accuracy (about 1 μm) (namely, where the accuracy is not enhanced). That is, the final Tp accuracy is determined by only the accuracy of the width Tw of B1 and B2 in head B and the accuracy of the relative heights between B1 and B2.

Figure 8:
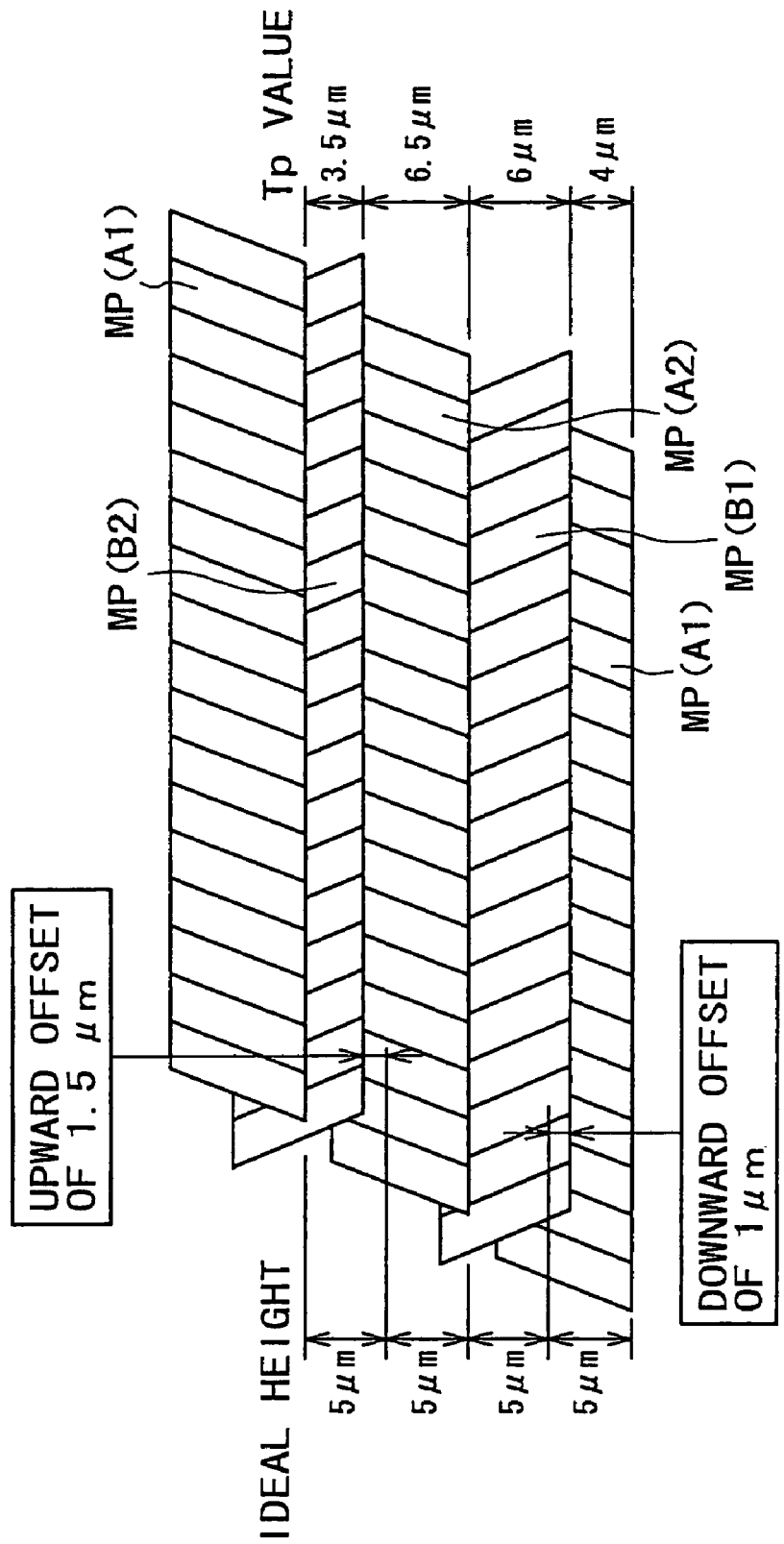
FIG. 8 illustrates the formation of magnetization patterns according to the relative art and the problems involved therein.

In the present embodiment, the Tp value as to A1 and A2 is (5±0.3) μm, and the Tp value as to B1 and B2 is (5±0.1) μm, so that dispersion can be reduced as compared with the case of the accuracy (5±1) μm described referring to FIG. 8, and the accuracy of formation of record signal patterns can be enhanced. In comparison in terms of record signal level, the level was lowered by about 2 dB in the conventional configuration, whereas the level is lowered by only about 0.5 dB (≈20·log(4.7/5)) in the present embodiment; thus, the S/N ratio is improved.

Besides, the present invention is effective for decreasing the Tp value. For example, where an ideal value is set to be Tp=3 μm while maintaining the current accuracy, the S/N ratio is lowered by about 3.5 dB on a record signal level basis in the case of the conventional configuration, whereas the S/N ratio is lowered by only about 0.9 dB in the present embodiment; thus, an improving effect of about 2.6 dB can be expected.

According to the above-described constitution, recorded signal patterns can be formed with a stable and high accuracy, even where the variation components influenced by the dispersion of relative height between heads, periodic or non-periodic oscillation attendant on the rotation of the drum, rotational jitter, etc. are maintained on the current technology level. For example, even in the case where the current accuracy is 1 μm as above-mentioned, it is possible to immediately apply the present invention to Tp=2 μm (a lowering of S/N ratio by about 1.4 dB), so that it is possible to meet the future demand for a narrower Tp and a higher capacity.

Incidentally, in the above configuration (II), a recording head may be constituted by the use of two or more chips each having a single gap (in this case, for example, head A is constituted of chips having magnetic gaps A1 and A2, respectively, whereas head B is constituted of chips having magnetic gaps B1 and B2, respectively). However, the configuration (I) is preferred, from the viewpoints of manufacture and accuracy.

In addition, while a description has been made on the assumption that thin-film heads are used as the recording heads in the above embodiment, it is apparent that any kind of recording head can be used (for example, a head other than a thin-film head is used as head A) in the application of the present invention, under conditions where the accuracies are sufficiently satisfied. Besides, the present invention it is applicable to a head system using a plurality of recording heads each having two or more magnetic gaps, and is applicable to head systems of various configurations based on a fixed head system, a vertical scan system, a semi-circular scan system, etc.

The present invention is not limited to the details of the above described preferred embodiment. The scope of the invention is defined by the appended claims, and all changes and modifications that fall within the equivalence of the scope of the claims are therefore to be embraced by the invention.

What is claimed is:

1. A head system for performing azimuth recording on a recording medium by use of a plurality of recording heads, wherein:

said head system comprises a first recording head A including a plurality of first magnetic gaps A1, A2 having a first azimuth angle, and a second recording head B including a plurality of second magnetic gaps B1, B2 having a second azimuth angle different from said first azimuth angle; and a positional relationship between said first and second magnetic gaps is so determined that in relation to each magnetization pattern formed on said recording medium by said first magnetic gaps of said first recording head, side edge portions in the formation direction of said patterns are overwritten by said second magnetic gaps of said second recording head, wherein the height of the lower edge portion of the gap A1 is about the same as the height of a central portion of the gap B2 and the height of a lower edge portion of the gap A2 is about the same as the height of a central portion of the gap B1, and wherein said first and second recording heads are thin-film heads, and a single head chip constituting each said recording head is provided with a plurality of magnetic gaps and wherein said first and second recording heads are mounted on a rotary drum, and each of said magnetization patterns formed on said recording medium is an inclined track, wherein said overwriting is conducted with such a positional relationship that a side edge portion of said magnetization pattern in the formation direction of said magnetization pattern formed by each said first magnetic gap of said first recording head coincides substantially with the center of each magnetization pattern formed by said second recording head and, wherein, as for the height relationship between the gaps A1 and A2, the upper edge of A1 is at the same height as the lower edge of A2, so that when the upper edge of A1 is at the same height as the lower edge of A2 side edges of magnetization patters formed on the tape by the magnetic gaps coincide with each other at the boundary therebetween.

2. A head system for performing azimuth recording on a recording medium by use of a plurality of recording heads, wherein:

said head system comprises a first recording head A including a plurality of first magnetic gaps A1, A2 having a first azimuth angle, and a second recording head B including a plurality of second magnetic gaps B1, B2 having a second azimuth angle different from said first azimuth angle; and a positional relationship between said first and second magnetic gaps is so determined that in relation to each magnetization pattern formed on said recording medium by said first magnetic gaps of said first recording head, side edge portions in the formation direction of said patterns are overwritten by said second magnetic gaps of said second recording head, wherein the height of the lower edge portion of the gap A1 is about the same as the height of a central portion of the gap B2 and the height of a lower edge portion of the gap A2 is about the same as the height of a central portion of the gap B1, and wherein said first and second recording heads are thin-film heads, and a single head chip constituting each said recording head is provided with a plurality of magnetic gaps and wherein said first and second recording heads are mounted on a rotary drum, and each of said magnetization patterns formed on said recording medium is an inclined track, wherein said overwriting is conducted with such a positional relationship that a side edge portion of said magnetization pattern in the formation direction of said magnetization pattern formed by each said first magnetic gap of said first recording head coincides substantially with the center of each magnetization pattern formed by said second recording head, wherein, as for the height relationship between the gaps A1 and A2, a slight clearance is provided between the upper edge of A1 and the lower edge of A2, or the upper edge of A1 and the lower edge of A2 overlap on each other, so that when there is a slight clearance between the upper edge of A1 and the lower edge of A2, the magnetization patterns formed on the tape by the magnetic gaps overlap on each other.

3. A recording and reproduction system for performing azimuth recording on a tape form recording medium by a plurality of recording heads, said system comprising a head system having a plurality of said recording heads, and a tape feeding means for feeding said tape form recording medium, wherein said head system comprises a first recording head A including a plurality of magnetic gaps A1, A2 having a first azimuth angle, and a second recording head B including a plurality of magnetic gaps B1, B2 having a second azimuth angle different from said first azimuth angle, and a positional relationship between said magnetic gaps is so determined that in relation to each magnetization pattern formed on said tape form recording medium by said magnetic gaps of said first recording head, side edge portions in the formation direction of said patterns are overwritten by said magnetic gaps of said second recording head, wherein the height of the lower edge portion of the gap A1 is about the same as the height of a central portion of the gap B2 and the height of a lower edge portion of the gap A2 is about the same as the height of a central portion of the gap B1, and, wherein said first and second recording heads are thin-film heads, and a single head chip constituting each said recording head is provided with a plurality of magnetic gaps and wherein said first and second recording heads are mounted on a rotary drum, and each of said magnetization patterns formed on said recording medium is an inclined track, wherein said overwriting is conducted with such a positional relationship that a side edge portion of said magnetization pattern in the formation direction of said magnetization pattern formed by each said magnetic gap of said first recording head coincides substantially with the center of each magnetization pattern formed by said second recording head, and wherein, as for the height relationship between the gaps A1 and A2, the upper edge of A1 is at the same height as the lower edge of A2, so that when the upper edge of A1 is at the same height as the lower edge of A2 side edges of magnetization patters formed on the tape by the magnetic gaps coincide with each other at the boundary therebetween.

4. A recording and reproduction system for performing azimuth recording on a tape form recording medium by a plurality of recording heads, said system comprising a head system having a plurality of said recording heads, and a tape feeding means for feeding said tape form recording medium, wherein said head system comprises a first recording head A including a plurality of magnetic gaps A1, A2 having a first azimuth angle, and a second recording head B including a plurality of magnetic gaps B1, B2 having a second azimuth angle different from said first azimuth angle, and a positional relationship between said magnetic gaps is so determined that in relation to each magnetization pattern formed on said tape form recording medium by said magnetic gaps of said first recording head, side edge portions in the formation direction of said patterns are overwritten by said magnetic gaps of said second recording head, wherein the height of the lower edge portion of the gap A1 is about the same as the height of a central portion of the gap B2 and the height of a lower edge portion of the gap A2 is about the same as the height of a central portion of the gap B1, and, wherein said first and second recording heads are thin-film heads, and a single head chip constituting each said recording head is provided with a plurality of magnetic gaps and wherein said first and second recording heads are mounted on a rotary drum, and each of said magnetization patterns formed on said recording medium is an inclined track, wherein said overwriting is conducted with such a positional relationship that a side edge portion of said magnetization pattern in the formation direction of said magnetization pattern formed by each said magnetic gap of said first recording head coincides substantially with the center of each magnetization pattern formed by said second recording head, wherein, as for the height relationship between the gaps A1 and A2, a slight clearance is provided between the upper edge of A1 and the lower edge of A2, or the upper edge of A1 and the lower edge of A2 overlap on each other, so that when there is a slight clearance between the upper edge of A1 and the lower edge of A2, the magnetization patterns formed on the tape by the magnetic gaps overlap on each other.

5. A magnetic recording method for performing azimuth recording on a recording medium by use of a plurality of recording heads, comprising the steps of:

forming first magnetization patterns on said recording medium by a first recording head A comprising a plurality of magnetic gaps A1, A2 having a first azimuth angle; and forming second magnetization patterns on said recording medium by overwriting side edge portions in the formation direction of said first magnetization patterns by a second recording head B comprising a plurality of magnetic gaps B1, B2 having a second azimuth angle different from said first azimuth angle, wherein said first and second recording heads are mounted on a rotary drum, and each of said magnetization patterns formed on said recording medium is an inclined track, and said overwriting is conducted with such a positional relationship that a side edge portion in the formation direction of said first magnetization pattern coincides substantially with the center in the width direction of said second magnetization pattern, and wherein the height of the lower edge portion of the gap A1 is about the same as the height of a central portion of the gap B2 and the height of a lower edge portion of the gap A2 is about the same as the height of a central portion of the gap B1, wherein, as for the height relationship between the gaps A1 and A2, the upper edge of A1 is at the same height as the lower edge of A2, so that when the upper edge of A1 is at the same height as the lower edge of A2 side edges of magnetization patters formed on the tape by the magnetic gaps coincide with each other at the boundary therebetween.

6. A magnetic recording method for performing azimuth recording on a recording medium by use of a plurality of recording heads, comprising the steps of:

forming first magnetization patterns on said recording medium by a first recording head A comprising a plurality of magnetic gaps A1, A2 having a first azimuth angle; and forming second magnetization patterns on said recording medium by overwriting side edge portions in the formation direction of said first magnetization patterns by a second recording head B comprising a plurality of magnetic gaps B1, B2 having a second azimuth angle different from said first azimuth angle, wherein said first and second recording heads are mounted on a rotary drum, and each of said magnetization patterns formed on said recording medium is an inclined track, and said overwriting is conducted with such a positional relationship that a side edge portion in the formation direction of said first magnetization pattern coincides substantially with the center in the width direction of said second magnetization pattern, and wherein the height of the lower edge portion of the gap A1 is about the same as the height of a central portion of the gap B2 and the height of a lower edge portion of the gap A2 is about the same as the height of a central portion of the gap B1, wherein, as for the height relationship between the gaps A1 and A2, a slight clearance is provided between the upper edge of A1 and the lower edge of A2, or the upper edge of A1 and the lower edge of A2 overlap on each other, so that when there is a slight clearance between the upper edge of A1 and the lower edge of A2, the magnetization patterns formed on the tape by the magnetic gaps overlap on each other.

\* \* \* \* \*

UNITED STATES PATENT AND TRADEMARK OFFICE
CERTIFICATE OF CORRECTION

PATENT NO. : 7,420,758 B2
APPLICATION NO. : 10/750820
DATED : September 2, 2008
INVENTOR(S) : Yasutoshi Inoue et al.

It is certified that error appears in the above-identified patent and that said Letters Patent is hereby corrected as shown below:

Column 11, Line 5:
"patters" should read -- patterns --.

Column 12, Line 21:
"patters" should read -- patterns --.

Column 13, Line 31:
"patters" should read -- patterns --.

Signed and Sealed this

Fourth Day of November, 2008

JON W. DUDAS
*Director of the United States Patent and Trademark Office*